United States Patent
Maughan

[11] Patent Number: 6,102,604
[45] Date of Patent: Aug. 15, 2000

[54] BOOTED SEAL FOR A BALL AND SOCKET JOINT

[75] Inventor: Garth B. Maughan, Delta, Ohio

[73] Assignee: Dana Corporation, Toledo, Ohio

[21] Appl. No.: 09/053,976

[22] Filed: Apr. 2, 1998

[51] Int. Cl.⁷ ................................................. F16C 11/06
[52] U.S. Cl. ........................... 403/134; 403/51; 277/643
[58] Field of Search ................................ 403/50, 51, 134, 403/135, 140, 122; 277/643, 614, 635

[56] References Cited

U.S. PATENT DOCUMENTS

| | | | |
|---|---|---|---|
| 2,752,178 | 6/1956 | Hoffman | 403/51 |
| 2,896,987 | 7/1959 | Meyer | 403/50 |
| 3,027,182 | 3/1962 | Reuter . | |
| 3,195,360 | 7/1965 | Burnett | 403/50 X |
| 3,216,754 | 11/1965 | Smith et al. . | |
| 3,273,923 | 9/1966 | Ulderup . | |
| 3,389,927 | 6/1968 | Herbenar | 403/51 X |
| 3,430,995 | 3/1969 | Herbenar et al. | 403/51 |
| 3,683,421 | 8/1972 | Martinie | 277/643 X |
| 4,305,596 | 12/1981 | Unterstrasser | 277/635 X |
| 4,386,869 | 6/1983 | Smith . | |
| 4,418,918 | 12/1983 | Nicoll | 277/643 X |
| 4,549,830 | 10/1985 | Hette . | |
| 4,848,950 | 7/1989 | Haberstrob . | |
| 5,066,159 | 11/1991 | Urbach . | |
| 5,601,378 | 2/1997 | Fukukawa et al. | 403/140 |
| 5,653,545 | 8/1997 | Moormann et al. | 403/50 |

FOREIGN PATENT DOCUMENTS

| | | | |
|---|---|---|---|
| 2942005 | 5/1981 | Germany | 403/51 |

*Primary Examiner*—Harry C. Kim
*Attorney, Agent, or Firm*—Rader Fishman & Grauer PLLC

[57] ABSTRACT

The invention relates to a boot seal for a ball and socket joint having a boot seal. The boot seal includes a bulb on a sealing lip. The bulb is compressed within a compression nest that is defined between cooperating radial notches that are formed on the socket ceiling and a bearing surface, respectively, when the bearing is fully installed in the housing. The radial notch in the socket ceiling serves to hold the boot seal in place to permit an assembled bearing and a ball stud assembly to be inserted within the cavity and thereby mechanically secure the boot seal within the socket.

16 Claims, 2 Drawing Sheets

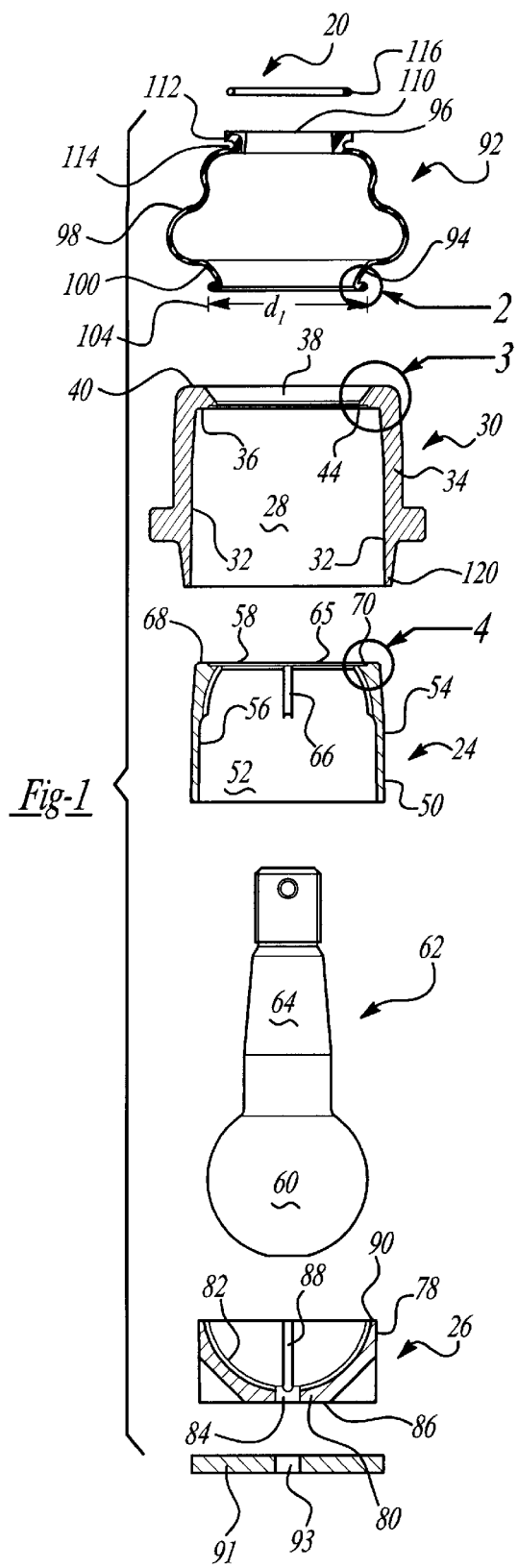
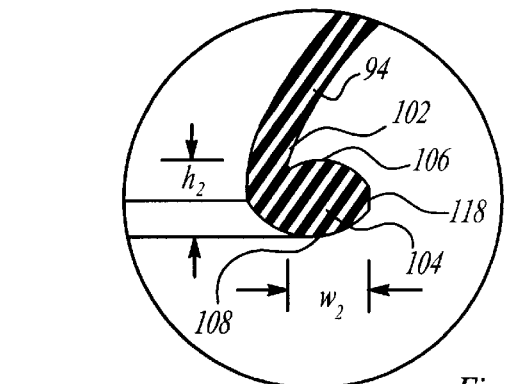
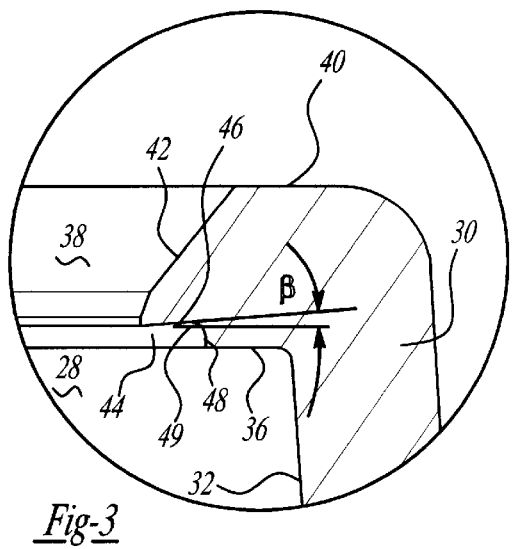
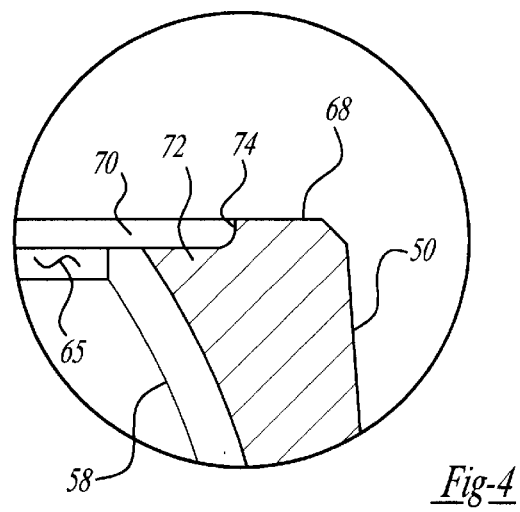

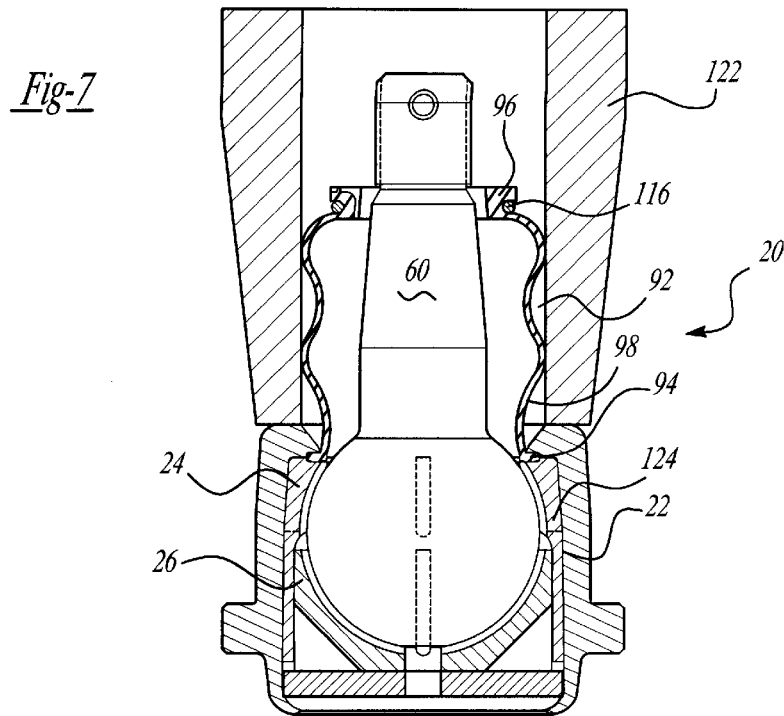
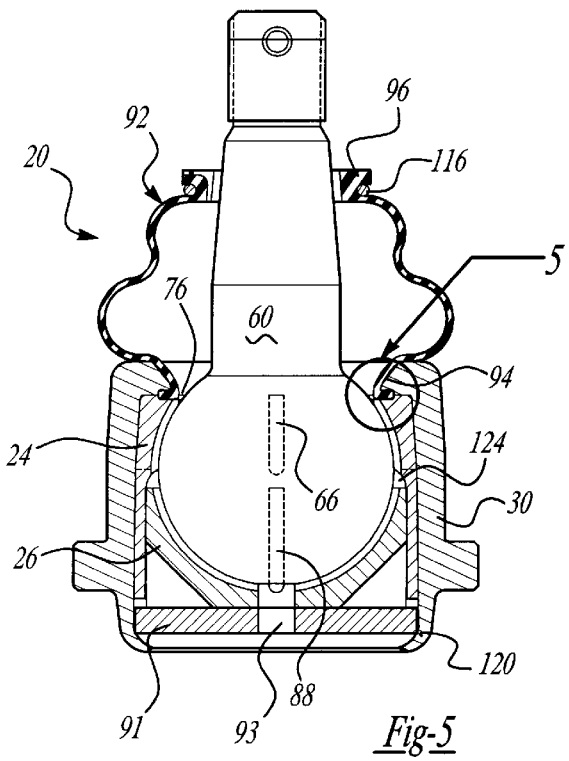
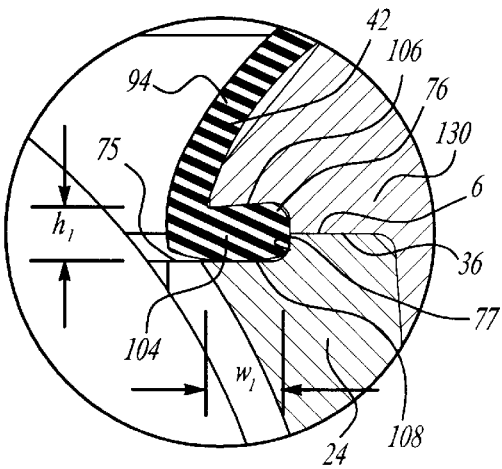

BOOTED SEAL FOR A BALL AND SOCKET JOINT

FIELD OF THE INVENTION

The present invention relates generally to a boot seal for a ball and socket joint. More particularly, the invention relates to a boot seal that has a sealing lip captured within a socket when an outer bearing is inserted into the socket.

BACKGROUND OF THE INVENTION

Ball and socket joints are used in a variety of applications, including rack and pinion inner tie rod socket assemblies, steering knuckles, drag links, and connecting rod assemblies. Ball and socket joints typically include a generally cylindrical socket adapted to receive a bearing together with a head of a ball stud. The bearing reduces the level of friction between the socket and ball stud head. Ball joints may further include a boot seal for sealing the opening between the socket and the ball stud to keep debris and foreign fluid out of the ball and socket joint, thereby prolonging the wear life of the joint.

Known ball and socket joints include a machined groove around the outside of the socket. The boot seal is externally attached to the housing by means of a spring wire clip that cooperates with the external groove. However, this method of attachment of the boot seal has disadvantages. First, the groove must be machined into the housing to precise tolerances. The machining step increases production costs. Further, grooves that do not achieve the desired tolerance range result in wasted material.

Additionally, a spring wire clip must be incorporated into the seal. The incorporation of the spring wire clip increases handling and assembly costs. Spring wire clips also may become distorted and/or incorrectly installed around the boot seal during assembly which could compromise sealing effectiveness and increase the potential for boot seal damage.

Other known ball and socket joints that incorporate boot seals have captured an edge or lip between a socket flange and a bearing. However, these assemblies are disadvantageous as there is no mechanism for retaining the boot seal in place during the assembly process, thereby increasing the likelihood of damage occurring to the boot seal.

SUMMARY OF THE INVENTION

The present invention is relates to a ball and socket joint having a boot seal for keeping debris and foreign fluid out of the joint. The ball socket joint includes a socket, an outer bearing, an inner bearing, a ball stud and a boot seal. The socket includes a cavity having an inner peripheral surface and a ceiling. The ceiling has a first radial notch formed therein. The first radial notch includes a ceiling that is generally parallel to the ceiling of the socket and an end wall section that extends from the ceiling of the socket to the ceiling of the first radial notch. The end wall section is generally perpendicular to the ceiling of the first radial notch and is spaced radially inwardly from the inner peripheral surface of the socket cavity. The ceiling of the first radial notch is formed so as to be slightly angled relative to the socket ceiling.

The outer bearing is receivable in the socket cavity. The outer bearing includes an axial surface that contacts the ceiling of the socket cavity, a cavity and a spherical inner seat face. The inner seat face engages a head of the ball stud. The axial surface includes a second radial notch is formed therein. The second radial notch has a floor and an end wall section. The floor is generally parallel to the axial surface. The end wall section extends from the axial surface to the floor and so as to be generally perpendicular to the floor. When the outer bearing is inserted into the socket cavity, the second radial notch and the first radial notch cooperate to form a compression nest having an open end and a closed end. The first radial notch ceiling and the second radial notch floor are opposing and define a predetermined height of the compression nest. The end wall sections are generally aligned to form the closed end. A distance from the open end to the closed end defines a predetermined width of the compression nest.

The inner bearing is receivable within the outer bearing cavity and has a spherical seat face for contacting the stud head of the ball stud.

The boot seal has an expandable body portion with first and second sealing lips. A first sealing lip includes a bulb having a predetermined height and width that is larger than the predetermined height and width of the compression nest.

During assembly of the ball and socket joint, the bulb engages the first radial notch such that the bulb is retained internally within the socket without requiring any additional sealing members, such as a spring wire clip, thereby reducing costs associated with inventory control and assembly. Further, by eliminating the use of a spring wire clip, the potential of having the clip distorted or incorrectly installed, thereby causing damage to boot seal, is also eliminated such that sealing effectiveness is insured. A sub-assembly, including the bearings and the ball stud, is then inserted into the cavity of the socket. The second radial notch aligns with the first radial notch and contacts the bulb, compressing the bulb within the compression nest, thereby mechanically securing the boot seal internally within the socket without any additional sealing members.

BRIEF DESCRIPTION OF THE DRAWINGS

The features and inventive aspects of the present invention will become more apparent upon reading the following detailed description, claims, and drawings, of which the following is a brief description:

FIG. 1 is an exploded cross-sectional view of components of a ball and socket joint in accordance with the present invention.

FIG. 2 is an enlarged cross-sectional view of a sealing lip of a boot seal shown by encircled region 2 of FIG. 1.

FIG. 3 is an enlarged cross-sectional view of a socket shown by encircled region 3 of FIG. 1.

FIG. 4 is an enlarged cross-sectional view of an outer bearing shown by encircled region 4 of FIG. 1.

FIG. 5 is a cross-sectional view of the assembled ball and socket joint with the boot seal.

FIG. 6 is an enlarged cross-sectional view of a bulb of the boot seal mechanically attached to the ball and socket joint in accordance with the present invention shown by encircled region 6 of FIG. 5.

FIG. 7 is a cross-sectional view of the assembled ball and socket joint incorporating the boot seal.

DETAILED DESCRIPTION OF PREFERRED EMBODIMENTS

A ball and socket joint 20 is shown in FIG. 1 which includes an annular outer bearing 24 and an annular inner bearing 26. Bearings 24 and 26 are received in a cavity 28 of a socket 30. Cavity 28 is defined by an inner peripheral surface 32 of a socket side wall 34 and a ceiling 36. Cavity 28 extends axially about an axis of symmetry. An aperture 38 is formed in an axial surface 40 of socket 30. A throat portion 42, as best seen in FIG. 3, extends between axial surface 40 and cavity 28 along the periphery of aperture 38. In the preferred embodiment, throat portion 42 flares outward towards axial surface 40. Disposed on ceiling 36 is a first radial notch 44, as best seen in FIG. 3. Notch 44 is positioned adjacent to throat portion 42 and has a ceiling 46 that is spaced from and generally parallel to ceiling 36 and an end wall section 48 that is generally perpendicular to ceiling 46 and spaced radially inwardly from inner peripheral surface 32. Preferably, ceiling 46 is formed at a predetermined angle β relative to ceiling 36 approximately in the range of 5–15°, to be discussed later in greater detail. A corner 49, which is formed by the intersection of ceiling 46 and end wall section 48, may be radiused so as to be rounded.

Outer bearing 24 includes an outer peripheral surface 50 which is shaped so as to conform to inner peripheral surface 32 of cavity 28. A cavity 52 is defined within outer bearing 24 by a generally cylindrical skirt 54 that extends about the axis of symmetry of socket 30 cavity 28. A transition zone 56 separates cavity 52 from a spherical seat face 58 that engages a spherical stud head 60 of a ball stud 62 and forms an inner peripheral surface of bearing 24. A shank 64 of ball stud 62 passes through an aperture 65 formed in bearing 24 such that stud head 60 engages seat face 58. To aid in lubrication, seat face 58 may further include a plurality of axial extending lubrication grooves 66 extending from transition zone 56 to an upper axial surface 68.

Bearing 24 also includes a second radial notch 70 formed upper axial surface 68. Second radial notch 70, as best seen in FIG. 4, includes a floor 72 that is spaced from and generally parallel to upper axial surface 68 and end wall section 74 that is generally perpendicular to and floor 72 and spaced radially inward from outer peripheral surface 50. When outer bearing 24 is inserted into cavity 28 of socket 30, end wall sections 48 and 74 are aligned and ceiling 46 and floor 72 are opposing, such that second radial notch 70 cooperates with first radial notch 44 to form a compression nest 76 that has an open end 75 and a closed end 77. Opposing ceiling 46 and floor 72 define a predetermined height $h_1$ and a distance from open end 75 to closed end 77 define a predetermined width $w_1$, as best seen in FIG. 6. In the preferred embodiment, first radial notch 44 and second radial notch 70 each comprise approximately half the height $h_1$ of compression nest 76. Compression nest 76 will be discussed later in greater detail.

Inner bearing 26 is radially compression preloaded by being forced into cavity 52 of outer bearing 24. Bearing 26 includes a generally cylindrical outer peripheral surface 78, an unloaded diameter of which is greater than the corresponding unloaded diameter of skirt 54 of outer bearing 24. Bearing 26 also includes a generally frustoconical conical nose 80. To promote the mating of outer and inner bearing 24 and 26, both outer peripheral surface 78 and skirt 54 may be wedge shaped. Inner bearing 26 has a spherical inner seat face 82 which engages stud head 60 after inner bearing 26 is mated with outer bearing 24. Seat faces 58 and 82 share a common diameter and secure stud head 60 and limit its degree of freedom of rotational motion about a common center point.

To aid in lubrication, nose 80 of inner bearing 26 has an opening 84 that is aligned with the symmetrical axis of joint 20. Opening 84 extends axially between seat face 82 and a lower axial surface 86. A plurality of lubrication grooves 88 formed within seat face 82 extend axially between opening 84 and an upper axial surface 90.

Lower axial surface 86 acts as a compression rim to engage an annular sealing washer 91. Sealing washer 91 is generally formed from steel and has an opening 93 positioned in approximately the center of sealing washer 91. Opening 93 receives a grease fitting (not shown) for re-greasing joint 20 and aligns with opening 84.

Joint 20 further includes a boot seal 92 for sealing the components of joint 20 against debris and foreign fluids. Boot seal 92, which is constructed of an elastomeric material, includes first and second sealing lips 94 and 96, respectively and a body portion 98 therebetween. First sealing lip 94 is defined by a generally conical shaped section 100 that tapers outward toward body portion 98. An end 102 of first sealing lip 94 includes a radially outwardly extending bulb 104, as best seen in FIG. 2. Bulb 104 has a top surface 106 and a bottom surface 108 that defines a predetermined height $h_2$. End 102 and a peripheral end 109 of bulb 104 define a predetermined width $w_2$. Height $h_2$ and width $w_2$ are somewhat larger than height $h_1$ and $w_1$ of compression nest 76 such that when bulb 104 is positioned within compression nest 76, bulb 104 is compressed to width $w_1$. The compression serves to mechanically secure boot seal 92 internally within socket 30, quickly, easily and without requiring the addition of a separate sealing means such as a spring wire clip. By eliminating the need for the clip, the number of parts for joint 20 is reduced, thereby reducing assembly time and costs associated with inventory control and manufacturing.

Second sealing lip 96 has a generally cylindrical inner surface 110 that selectively engages shank 64 of ball stud 60. An outer surface 112 of second sealing lip 96 includes an external radially extending groove 114. A spring member 116, such as a spring wire clip, is selectively engageable with groove 114 to urge inner surface 110 against shank 64, thereby effectively sealing joint 20.

Description of the assembly of ball and socket joint 20 will now be described in reference to FIGS. 1 and 5. First, boot seal 92 is positioned in socket 30 such that bulb 104 is engaged with first radial notch 44. An outer peripheral surface 118 of first sealing lip 94 has a predetermined diameter d, that is large enough so as to disposed first sealing lip 94 against throat portion 42 of socket 30. The angle β of ceiling 46 cooperates with throat portion 42 to retain bulb 104 within first radial notch 44 during assembly of joint 20, without requiring a separate attachment means such as a spring wire clip. By eliminating the need for a spring wire clip at socket 30, the potential of having the spring wire clip distorted or incorrectly installed, thereby causing damage to boot seal 92 is also eliminated. Thus, sealing effectiveness is insured.

Ball stud shank 64 is then passed through aperture 65 of outer bearing 24 such that stud head 60 contacts seat face 58. The inner bearing 26 is then mated with outer bearing 24, to form a subassembly. The subassembly is inserted into cavity 28 of socket 30 with axial surface 68 contacting ceiling 36. Second radial notch 70 aligns with first radial notch 44 to form compression nest 76. Opposing ceiling and floor 46 and 72, respectively, contact upper and lower surfaces 106 and 108 of bulb 104, thereby compressing bulb 104 to a width $w_1$ and mechanically securing boot seal 92 internally within socket 30. By positioning bulb 104 internally within socket 30, functional performance and sealing effectiveness of joint 20 is increased because the seal is directly adjacent to the wear sensitive parts, i.e., stud 60 and bearings 24 and 26. Further, by positioning bulb 104 in socket 30 prior to the insertion of the subassembly, outer bearing 24 can be preloaded against bulb 104 and ceiling 36 thereby insuring that bulb 104 is adequately retained internally within socket 30.

The final assembly step includes closing socket 30 to seal joint 20. Socket 30 is typically a forging or a casting and has an annular lip 120 that is crimped about retaining ring 91. When socket 30 is closed, an axial load is applied to retaining ring 91 which is transferred to upper axial surface 68 of outer bearing 24 to provide axial compression preloading to both bearings 24 and 26.

Once assembled, ball and socket joint 20 and boot seal 92 may be positioned in a support base 122, as seen in FIG. 7, to protect against damage. Body portion 98 is lightly squeezed to reduce its diameter and then tucked into support base 122.

An annular pocket 124 is formed between outer bearing 24 and inner bearing 26 that is generally perpendicular to lubrication grooves 66 and 88. As best shown in FIGS. 5 and 7, pocket 124 is formed by transition zone 56 and skirt 54 of outer bearing 24, inner bearing 26 and stud head 60. Pocket 124 functions as a lubricant well.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A ball and socket joint having a boot seal, the combination comprising:
   a socket with a cavity having a ceiling with a first radial notch therein;
   at least one annular bearing receivable within said socket, said bearing having an inner seat face and an axial surface that is generally parallel to said ceiling such that said axial surface engages and contacts said ceiling when said annular bearing is received within said socket;
   a ball stud with a stud head and a shank, said stud head engaging said seat face;
   a boot seal that has an expandable body portion and a sealing lip, said lip having a bulb that is slightly larger than said first radial notch, said bulb being receivable within said first radial notch such that said bulb is compressively retained within said first radial notch during insertion of said bearing into said cavity of said socket, said axial surface of said bearing serving to compress said bulb within said first radial notch to mechanically secure said bulb internally within said socket.

2. The ball and socket joint of claim 1, wherein said first radial notch has a ceiling that is generally parallel to said ceiling of said socket and an end wall section that extends from said ceiling of said socket to said ceiling of said first radial notch, said end wall section being generally perpendicular to said ceiling of said first radial notch.

3. The ball and socket joint of claim 2, wherein said axial surface of said bearing further includes a second radial notch therein, said second radial notch having a floor that is generally parallel to said axial surface and an end wall section that extends from said axial surface to said floor, said end wall section being generally perpendicular to said floor, said second radial notch cooperating with said first radial notch to form a compression nest having an open end and a closed end, whereby said ceiling of said first radial notch and said floor of said second radial notch are opposing and define a predetermined height and said end wall sections are generally aligned to form said closed end, a distance from said open end to said closed end defining a predetermined width, said predetermined height and width being smaller than a height and width of said bulb.

4. The ball and socket joint of claim 3, wherein said first radial notch and said second radial notch each form approximately half of said predetermined height of said compression nest.

5. The ball and socket joint of claim 1, wherein said boot seal has a second sealing lip, said second lip including a groove.

6. The ball and socket joint of claim 5, wherein a spring member is selectively receivable within said groove to urge said second sealing lip against said ball stud.

7. A ball and socket joint having a boot seal, the combination comprising:
   a socket with a cavity having a ceiling and an inner peripheral surface, wherein a first radial notch is formed within said ceiling radially inward from said inner peripheral surface of said cavity, said first radial notch having a ceiling that is formed at a predetermined angle relative to said ceiling of said socket and an end wall section that extends from said ceiling of said first radial notch to said ceiling of said socket;
   at least one annular bearing receivable within said socket, said bearing having an axial surface that engages said ceiling of said socket, a cavity, a spherical inner seat face and a second radial notch formed within said axial surface, said second radial notch having a floor that is generally parallel to said axial surface and an end wall section that extends form said axial surface to said floor, said second radial notch cooperating with said first radial notch of said socket to form a compression nest having an open end and a closed end, whereby said ceiling of said first radial notch and said floor of said second radial notch are opposing and define a predetermined height and said end wall sections are generally aligned to form said closed end, a distance from said open end to said closed end defining a predetermined width;
   a ball stud with a stud head and a shank, said stud head engaging said seat face; and
   a boot seal with an expandable body portion and first and second sealing lips, said first lip having a bulb receivable within said compression nest, said bulb having a predetermined height and width that is larger than said predetermined height and width of said compression nest such that said bulb is compressed within said compression nest to mechanically lock said bulb internally within said socket.

8. A The ball and socket joint of claim 7, wherein said predetermined angle is in the range of approximately 5–15°.

9. The ball and socket joint of claim 7, wherein said socket has an axial surface with an aperture extending therethrough and a throat portion formed between said axial surface and said cavity of said socket around the periphery of said aperture, wherein said bulb of said boot seal is compressively retained within said first radial notch such that a portion of said body portion becomes disposed against said throat portion thereby holding said boot seal place prior to said bearing and ball stud being inserted into said socket such that said bearing and ball stud are preloaded against said bulb and said socket ceiling.

10. The ball and socket joint of claim 7, wherein said at least one bearing includes an annular inner bearing and an annular outer bearing, said second radial notch being disposed in said axial surface of said outer bearing, said inner bearing receivable within said outer bearing cavity and having a second spherical inner seat face that cooperates with said spherical inner seat face of said outer bearing to engage said stud head of said ball stud.

11. A ball and socket joint having a boot seal, the combination comprising:

a socket with a cavity having a ceiling with a first radial notch therein, wherein said first radial notch has a ceiling that is generally parallel to said ceiling of said socket and an end wall section that extends from said ceiling of said socket to said ceiling of said first radial notch, said end wall section being generally perpendicular to said ceiling of said first radial notch;

at least one annular bearing receivable within said socket, said bearing having an axial surface that engages said ceiling and an inner seat face, wherein said axial surface of said bearing further includes a second radial notch therein, said second radial notch having a floor that is generally parallel to said axial surface and an end wall section that extends from said axial surface to said floor, said end wall section being generally perpendicular to said floor;

a ball stud with a stud head and a shank, said stud head engaging said seat face; and a boot seal that has an expandable body portion and a sealing lip, said lip having a bulb receivable within said first radial notch such that said bulb is compressively retained within said first radial notch during insertion of said bearing into said cavity of said socket, said second radial notch cooperating with said first radial notch to form a compression nest having an open end and a closed end, whereby said ceiling of said first radial notch and said floor of said second radial notch are opposing and define a predetermined height and said end wall sections are generally aligned to form said closed end, a distance from said open end to said closed end defining a predetermined width, said predetermined height and width being smaller than a height and width of said bulb such that said bulb is compressed within said compression nest to mechanically secure said bulb internally within said socket.

12. The ball and socket joint of claim 11, wherein said first radial notch and said second radial notch each form approximately half of said predetermined height of said compression nest.

13. A ball and socket joint having a boot seal, the combination comprising:

a socket with a cavity having a ceiling with a first radial notch therein, said first radial notch having a ceiling that is formed at a predetermined angle relative to said ceiling of said socket and an end wall section that extends between said ceiling of said socket and said ceiling of said first radial notch, wherein said predetermined angle is greater than 0°;

at least one annular bearing receivable within said socket, said bearing having an axial surface that engages said ceiling and an inner seat face;

a ball stud with a stud head and a shank, said stud head engaging said seat face; and a boot seal that has an expandable body portion and a sealing lip, said lip having a bulb that is slightly larger than said first radial notch, said bulb being receivable within said first radial notch such that said bulb is compressively retained within said first radial notch during insertion of said bearing into said cavity of said socket, said axial surface of said bearing serving to compress said bulb within said first radial notch to mechanically secure said bulb internally within said socket.

14. The ball and socket joint of claim 13, wherein said predetermined angle is in the range of approximately 5–15°.

15. The ball and socket joint of claim 13, wherein a corner is formed between said ceiling of said first radial notch and said end wall section is rounded.

16. The ball and socket joint of claim 13, wherein said socket has an axial surface with an aperture extending therethrough and a throat portion being formed between said axial surface and said cavity of said socket around the periphery of said aperture, said throat portion flaring outwardly toward said axial surface, wherein said bulb of said boot seal is engageable with said first radial notch such that a portion of said body portion becomes disposed against said throat portion, said throat portion cooperating with said first radial notch to hold said bulb within said socket prior to said bearing and said ball stud being inserted into said socket such that said bearing may be preloaded against said bulb and said socket ceiling.

* * * * *